(12) United States Patent
Hyzin et al.

(10) Patent No.: US 6,722,789 B1
(45) Date of Patent: Apr. 20, 2004

(54) RELEASABLE TERMINUS RETENTION

(75) Inventors: Peter Joseph Hyzin, Trabuco Canyon, CA (US); James Edward Novacoski, Yucaipa, CA (US); Can Trong Nguyen, Garden Grove, CA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 10/020,818

(22) Filed: Dec. 12, 2001

(51) Int. Cl.[7] ................................................. G02B 6/36
(52) U.S. Cl. ....................................................... 385/78
(58) Field of Search ............................. 385/58, 78, 79, 385/80, 81, 82, 83, 84, 85, 86, 87, 88, 89, 90, 91, 92, 55

(56) References Cited

U.S. PATENT DOCUMENTS

| | | |
|---|---|---|
| 3,947,182 A | 3/1976 | McCartney |
| 3,963,323 A | 6/1976 | Arnold .......................... 350/96 |
| 4,178,068 A | 12/1979 | Hoover ......................... 350/96 |
| 4,279,469 A | 7/1981 | Forman ......................... 350/96 |
| 4,735,480 A | 4/1988 | Levinson et al. ......... 350/96.21 |
| 4,747,658 A | 5/1988 | Borsuk et al. ............. 350/96.2 |
| 4,787,701 A | 11/1988 | Stenger et al. |
| 4,798,441 A | 1/1989 | Clark ......................... 350/96.2 |
| 5,097,523 A | 3/1992 | Marie .......................... 385/59 |
| 5,253,316 A | 10/1993 | Shibutani et al. |
| 5,373,573 A | 12/1994 | Welsh ........................ 385/69 |
| 5,542,015 A | 7/1996 | Hultermans .................. 385/60 |
| 5,608,828 A | 3/1997 | Coutts et al. ................. 385/59 |
| 5,764,834 A | 6/1998 | Hultermans .................. 385/60 |
| 6,254,283 B1 | 7/2001 | Novacoski et al. ........... 385/78 |

FOREIGN PATENT DOCUMENTS

| | | |
|---|---|---|
| EP | 0 624 810 A2 | 5/1994 |
| EP | 0 624 810 A3 | 5/1994 |
| EP | 1 249 722 A2 | 4/2002 |

*Primary Examiner*—Javaid H. Nasri
(74) *Attorney, Agent, or Firm*—Roger C. Turner

(57) ABSTRACT

An optical fiber connector (12) has a terminus (34) lying in a housing passage (44) and biased forwardly by a spring (80), which enables removal of the terminus while the spring remains in the passage, in a compact arrangement. The terminus body has a groove (112) that forms a rearwardly-facing shoulder (120). A retainer (142) includes a clip (102) with tines (110) that engage the shoulder to push the terminus forwardly, the clip being pushed forwardly by a front end (92) of the spring. The retainer includes a sleeve member (100) which is slideable in the terminus passage and has a rear end (94) that abuts the front end of the spring to push the sleeve forwardly, the spring having a forwardly-facing shoulder (104) that abuts the rear end of the clip to push it forwardly. Each of two mating connectors (12, 14) has a spring that biases its terminus toward the other terminus to enable installation of a replacement terminus.

8 Claims, 2 Drawing Sheets

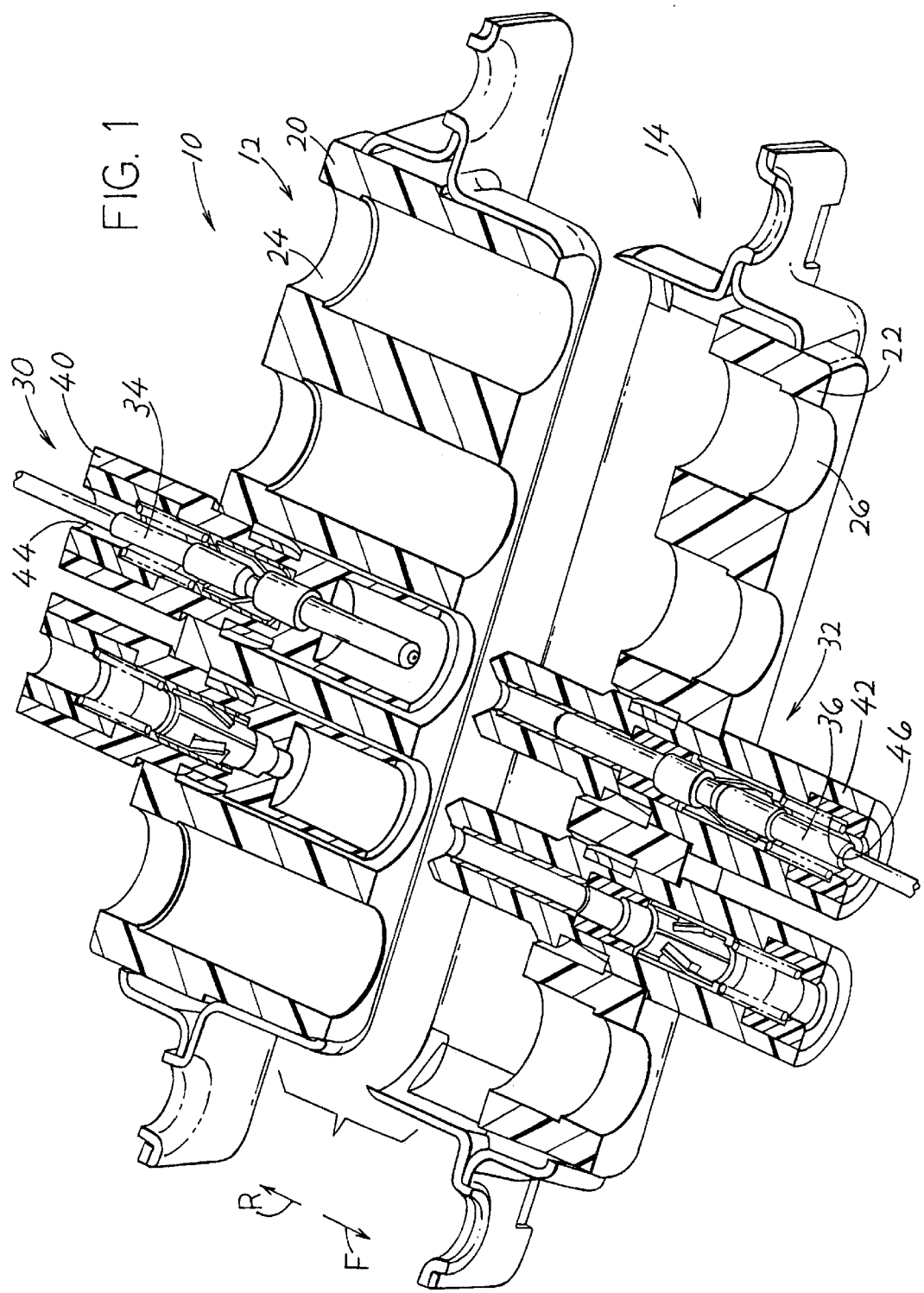

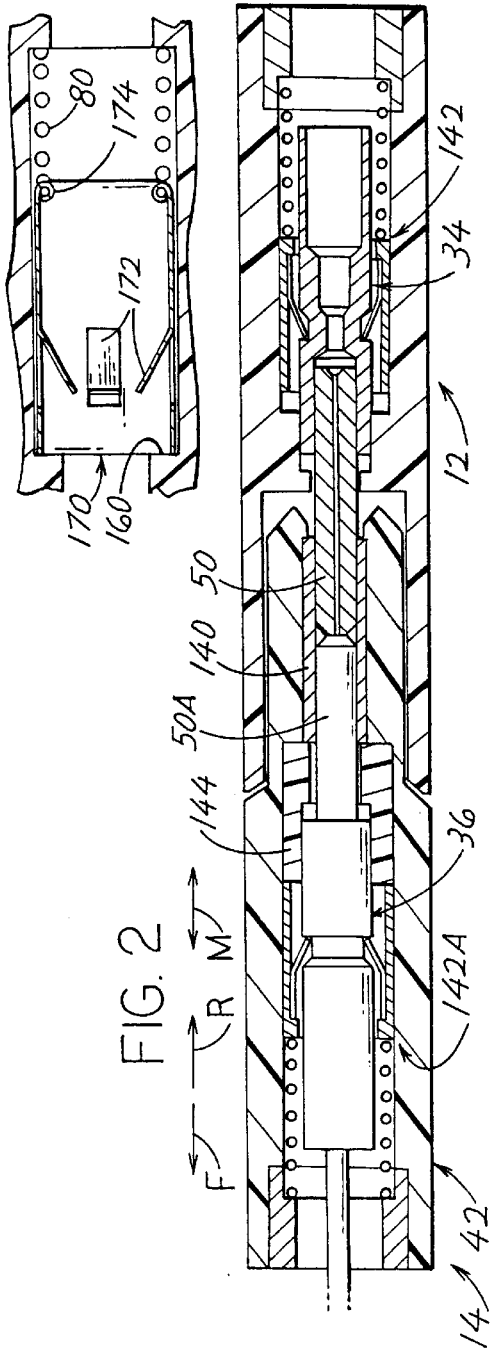

RELEASABLE TERMINUS RETENTION

BACKGROUND OF THE INVENTION

The tips of two optical fibers are commonly coupled by placing each optical fiber in a terminus and biasing at least one terminus toward the other so the tips of the termini and of the optical fibers abut one another. At least one of the two connectors includes a spring that is usually a coil spring to press the terminus forwardly. When the terminus must be removed for cleaning or repair, the spring usually has to be removed with the terminus. The spring seldom needs maintenance, but its multiple turns can catch on other items, and it would be desirable if the spring could remain with the rest of the connector when a terminus was removed. It is desirable to enable removal of a single terminus by simply inserting a thin tool and pulling out the terminus instead of requiring the removal of a back plate or the like that would disrupt other mating termini. It is desirable that the terminus arrangement have a minimum number of parts and be compact to enable a large number of termini to be closely spaced.

SUMMARY OF THE INVENTION

In accordance with one embodiment of the present invention, an optical fiber connector and connector system are provided which enable replacement of a terminus without withdrawing a biasing spring and which minimizes the housing passage diameter required for each terminus. The connector includes a terminus that lies in a housing passage, a spring for biasing the terminus forwardly, and a clip that is biased forwardly by the spring and that engages a shoulder on the terminus to bias it forwardly. A terminus can be removed by inserting a tool that expands the clips, and then pulling out the terminus while leaving the clip and spring behind in the housing passage.

In one embodiment of the invention, a sleeve member is provided which can slide within the housing passage. The sleeve member has a forwardly-facing shoulder that engages a rear end of the clip, and has a rearwardly-facing surface that engages a front end of the spring. The sleeve member provides a reliable sliding part to transfer force between the spring and clip. Another embodiment of the invention uses only the clip, without a separate sleeve member.

The rearwardly-facing shoulder on the terminus that engages the front end of the clip, can be formed by a groove formed in the outside of a body of the terminus. The body can have a narrow neck passage part lying radially within the groove to avoid weakening the body.

In a system with two mating connectors, all termini are biased by a spring to enable replacement of a terminus, and to enable a single terminus design to be used.

The novel features of the invention are set forth with particularity in the appended claims. The invention will be best understood from the following description when read in conjunction with the accompanying drawings.

BRIEF DESCRIPTION OF THE DRAWINGS

FIG. 1 is a partial sectional isometric view of a connector system of the invention, showing the two connectors separated but ready to mate.

FIG. 2 is a sectional side view of the system of FIG. 1, showing the two connectors fully mated.

FIG. 3 is an enlarged sectional view of a portion of one of the connectors of FIG. 2.

FIG. 4 is a partial sectional view of a connector of another embodiment of the invention.

DESCRIPTION OF THE PREFERRED EMBODIMENTS

FIG. 1 illustrates a connector system 10 which includes first and second, or rear and front connectors 12, 14. Each connector includes a frame 20, 22 with bores 24, 26 for receiving terminus assemblies 30, 32. Each terminus assembly includes a terminus 34, 36, a housing 40, 42 with a housing passage 44, 46, and a retainer for holding each terminus in a corresponding terminus passage. It is possible to form each frame 20, 22 with narrow passages for holding corresponding termini without the separate housings 40, 42, in which case the frame can be referred to as a housing that forms housing passages that hold the termini.

FIG. 3 shows details of one terminus assembly 30 which includes the housing 40 that forms the housing passage 44 in which the first terminus 34 is mounted. The first terminus includes a ferrule 50 and a body 52. The ferrule has a rear end 54 that lies in a front portion of the body. The terminus has a terminus passage 56 that extends through the entire length of the terminus, and includes aligned passage portions 60, 62 formed in the terminus and in the body. An optical fiber member 64 which extends through the terminus passage includes a thin fiber 70 that lies in the ferrule passage portion 60 and a thicker rear portion 72 that includes a protective jacket, and that sometimes includes a thinner intermediate protective portion 74. A quantity 76 of resin can be used to fix the front portion of the optical fiber member 64 in the terminus passage.

The ferrule 50 is biased forwardly by a coil spring 80 which is used as a compression spring. The coil spring has a rear end 82 that abuts a largely forwardly-facing housing shoulder 84 in the housing passage. It is noted that the housing includes an insert 86 that is force fit into a main portion 90 of the housing to form the shoulder. The front end 92 of the spring pushes against the rear end 94 of a retainer 142 which includes a sleeve member 100 and a clip 102, The sleeve member 100 can slide in longitudinal M directions, which are front F and rear R directions.

The retention clip 102 is pushed forwardly by the sleeve member 100. The sleeve member has a largely forwardly-facing sleeve shoulder 104 that presses against a clip rear end 106. The clip has a front part 110 that forms at least one tine that extends at a forward and radially inward incline. That is, the front part 110 extends partially forward F and partially towards the axis 112 of the housing and terminus. The front part 110 has tines whose front tips 114 abut a largely rearwardly-facing terminus shoulder 120. In this way, the forward biasing of the spring causes forward basing of the sleeve member 100 and clip 102, thereby causing forward biasing of the terminus.

The terminus has a groove 122 whose front end forms the shoulder 120. The groove has a moderate length in order for the clip front part 110 to enter the groove and engage the shoulder 120. The body 52 is constructed with a small diameter in order to mount the termini close together, and therefore the groove 122 could weaken the body. Applicant forms the passage portion 62 of the body so it includes a neck passage part 124 of smaller diameter than passage parts 130, 132 lying immediately rearward and forward, respectively, of the neck part 124. It is noted that the intermediate protective portion 74 of the fiber extends closely through the neck part 124.

The parts of the second connector 14 shown in FIG. 2 may sometimes be referred to as "devices", as in "housing device" 42, "terminus device" 144, "ferrule device" 50A, etc. to distinguish parts of the second connector from those of the first connector.

FIG. 2 shows that the first and second ferrules 50, 50A of the first and second connectors 12, 14 are identical. Also, the retainer 142, 142A of the first and second connectors are identical. The ferrules 50, 50A project into opposite ends of an alignment sleeve 140. It is noted that the alignment sleeve 140 is captured in the housing 42 of the second connector, in an extension thereof, and held in place by an insert 144. However, both termini 34, 36 are identical and both retainers are identical. This enables a company that uses the connectors to stock only a single type of terminus, and avoids the need for the technician who must replace a terminus, to determine whether that particular terminus is one with a spring or not. As described below, the provision of a spring in each terminus assembly enables easy replacement of a terminus.

The terminus 34 of FIG. 3 can be removed by inserting a tool through the cylindrical gap 150 between the outside of the terminus and the inside of the retention assembly 142. Such a tool is in the form of a cylinder with a slot extending along its length to pass the optical fiber member 64 into the middle of the cylinder. Such cylinder is moved forward until it expands the tines forming the front part 110 of the clip, the terminus then being removable by pulling it out.

When the terminus is pulled out, not only are the clip 102 and sleeve member 100 left behind in the housing passage, but the spring 80 also remains behind. The spring then pushes the sleeve member and clip forwardly until the front end of the sleeve member, which forms a front end of the retainer 142, is stopped by a largely rearwardly-facing shoulder 160 formed on the housing as shown at 100B. The fact that the spring is left behind, means that the spring remains protected, instead of being exposed and possible catching on other items in the environment. Such items include a possible "rat's nest" of fibers that can extend from the rear of an optical fiber connector that holds many fibers. The clip is also protected by letting it remain in the housing.

When a technician must insert a cleaned or replacement terminus, the technician pushes the replacement terminus forwardly F into place. The terminus must be pushed forwardly beyond the operating position shown in FIG. 3, by a distance slightly more than the distance A. This is necessary in order that the terminus shoulder 120 moves slightly forward of the clip front end tips 114 which moved forward when the clip moved forward by distance A. The fact that the mating terminus or terminus device 36 (FIG. 2) of the second connector is spring biased, and therefore can move in the direction F by slightly more than the distance A, enables easy replacement of the terminus 34. The terminus can be pushed forward by distance B which is greater than A to enable the tine tips to snap behind the body shoulder. The spring forces are balanced so after the tines snap behind the body shoulder the termini move to the positions shown in FIG. 2.

The clip 102 can be formed of a continuous thin-walled tube with slots forming the tines at the front part 110. Instead, the clip can be formed of a piece of sheet metal that has been rolled into a cylindrical shape, and which expands until its rear portion expands against the inside of the sleeve member 100. Since the clip is not removed when a terminus is removed, either construction is suitable.

FIG. 4 shows another construction of a retainer in the form of a clip 170, which is a thin-walled tube with tines 172 punched out of the side walls of the tube. The rear end 174 of the tube has been folded inward to form a flange that reliably engages the front end of the coil spring 80. A separate sleeve member similar to 100 in FIG. 3 is not required, as the clip and sleeve member are combined into one thin clip. The one-piece retainer has the advantage of reducing the number of parts and in reducing the size of housing passage required to accommodate the clip and spring. It is noted that with the one-piece retainer, the spring can be of slightly smaller diameter.

Thus, the invention provides an optical fiber connector and an optical connector system which is compact, enables easy replacement of an optical fiber terminus, and enables the biasing spring to remain with the connector when a terminus is removed. The terminus is held in a housing by a retainer that includes a clip with tines (preferably more than one) that engage a terminus shoulder, and with a coil spring that biases the retainer forwardly to push the, terminus forwardly. The retainer can include a sleeve member with a rear end that abuts a front end of the coil spring and which forms a shoulder that pushes a separate clip forwardly. It is also possible to form the retainer from a single clip with a rear end that abuts the front end of the spring and which also forms tines that engage a shoulder on the terminus. In a connector system of the invention, both mating connectors include a spring. This facilitates replacement of a terminus, by enabling the replacement terminus to move forwardly beyond its normal position so the tines of the clip snap behind the terminus shoulder, before the terminus is pushed rearward slightly by the spring of the opposite connector.

A Although particular embodiments of the invention have been described and illustrated herein, it is recognized that modifications and variations may, readily occur to those skilled in the art, and consequently, it is intended that the claims be interpreted to cover such modifications and equivalents.

What is claimed is:

1. An optical fiber connector system that includes a first connector with a first terminus having a front portion forming a ferrulve and a rear portion forming a body, the terminus forming a fiber-holding terminus passage for holding an optical fiber, and the first connector having a first housing that has a terminus-holding housing passage with an axis and with a passage rear part forming a largely forwardly-facing housing passage shoulder, including a releaseable first retainer lying in said housing passage around said terminus, said retainer including a sleeve member forming a largely rearwardly-facing spring-engaging shoulder and a largely forwardly-facing clip-engaging shoulder;

said retainer also including a clip of resilient material with a rear end abutting said clip-engaging shoulder and a front portion forming at least one tine that extends forwardly and at a radially inward incline toward said axis;

a first coil spring extending between said housing passage shoulder and said retainer spring-engaging shoulder and biasing said retainer forwardly;

said terminus having a largely rearwardly-facing terminus shoulder;

said tine of said clip has a front tip that abuts said rearwardly-facing terminus shoulder, said tine being radially outwardly deflectable to release said terminus.

2. An optical fiber connector system that includes first and second connectors that respectively include first and second housings and first and second termini with corresponding first and second ferrules, said first terminus having a front portion forming a ferrule and a rear portion forming a body, the first terminus forming a fiber-holding terminus passage for holding an optical fiber, and the first housing has a terminus-holding housing passage with an axis and with a passage rear part forming a largely forwardly-facing housing passage shoulder, including a releaseable first retainer lying in said housing passage around said terminus, said retainer having a rear portion forming a largely rearwardly-facing retainer spring-engaging shoulder;

a first coil spring extending between said housing passage shoulder and said retainer spring-engaging shoulder and biasing said retainer forwardly;

said terminus having a largely rearwardly-facing terminus shoulder;

said retainer forming at least one tine that extends forwardly and at a radially inward incline toward said axis and that has a front tip that abuts said rearwardly-facing terminus shoulder, said tine being radially outwardly deflectable to release said terminus;

an alignment sleeve, said first and second ferrules each projecting into said alignment sleeve and having ferrule tips abutting one another;

said second terminus is substantially identical to said first terminus, and said second connector includes a second retainer and a second coil spring, said second housing having a passage forming a second housing shoulder that abuts an end of said second spring and said second retainer abuts an opposite end of said second spring and abuts said second terminus.

3. An optical fiber connector system that includes a first connector with a first terminus having a front portion forming a ferrule and a rear portion forming a body, the terminus forming a fiber-holding terminus passage for holding an optical fiber, and the first connector having a first housing that has a terminus-holding housing passage with an axis and with a passage rear part forming a largely forwardly-facing housing passage shoulder, including a releaseable first retainer lying in said housing passage around said terminus, said retainer having a rear portion forming a largely rearwardly-facing retainer spring-engaging shoulder;

a first coil spring extending between said housing passage shoulder and said retainer spring-engaging shoulder and biasing said retainer forwardly;

said terminus having a largely rearwardly-facing terminus shoulder;

said retainer forming at least one tine that extends forwardly and at a radially inward incline toward said axis and that has a front tip that abuts said rearwardly-facing terminus shoulder, said tine being radially outwardly deflectable to release said terminus;

said terminus includes a ferrule with a rear end and a body having an outer surface with a groove therein, at least a portion of said groove lying rearward of said ferrule rear end, said groove having a front end forming said rearwardly-facing terminus shoulder.

4. An optical fiber connector system that includes a first connector with a first terminus having a front portion forming a ferrule and a rear portion forming a body, the terminus forming a fiber-holding terminus passage for holding an optical fiber, and the first connector having a first housing that has a terminus-holding housing passage with an axis and with a passage rear part forming a largely forwardly-facing housing passage shoulder, including a releaseable first retainer lying in said housing passage around said terminus, said retainer having a rear portion forming a largely rearwardly-facing retainer spring-engaging shoulder, a first coil spring extending between said housing passage shoulder and said retainer spring-engaging shoulder and biasing said retainer forwardly;

said terminus having a largely rearwardly-facing terminus shoulder;

said retainer forming at least one tine that extends forwardly and at a radially inward incline toward said axis and that has a front tip that abuts said rearwardly-facing terminus shoulder, said tine being radially outwardly deflectable to release said terminus;

said fiber holding terminus passage portion includes a ferrule passage portion and a body passage portion that are aligned with each other, said body passage portion having a body passage portion front end with a diameter about equal to a ferrule diameter to closely receive said ferrule, a neck passage part lying rearward of said passage portion front end and having a smaller diameter than said passage portion front end, and a body passage portion rear part of a diameter larger than that of said neck passage part;

said body has an outer surface with a groove therein that lies radially outward of said neck passage part, said groove forming said rearwardly-facing groove shoulders.

5. A combination of an optical fiber connector and a mating connector device, comprising:

a housing having a housing passage with a rear portion forming a largely forwardly facing housing passage shoulder, and a front portion forming a largely rearwardly-facing retainer-abutting shoulder;

an optical fiber terminus lying in said housing passage, said terminus including a body with front and rear ends and a ferrule extending forwardly from said body, said body and ferrule having aligned passage portions;

an optical fiber member lying said aligned passage portions;

said body has a largely rearwardly-facing body shoulder;

a coil spring that has a rear end that lies against said housing passage shoulder, said coil spring having a spring front end;

a releaseable retainer with a rear portion that is biased forwardly by said spring front end, said retainer having a portion forming a plurality of tines that engage said body shoulder and that can be disengaged from said body shoulder, to enable removal of the terminus;

said retainer having a front end that abuts said retainer-abutting shoulder when said terminus is not present;

said mating connector device includes a housing device, a terminus device lying in said housing device and having a ferrule device rear end that abuts front end of said ferrule, and a spring device that biases said terminus device rearwardly toward said terminus while allowing said terminus device to move forwardly sufficiently for said retainer tines to snap behind said body shoulder during installation of said terminus.

6. An optical fiber connector comprising:

a housing having a housing passage with a rear portion forming a largely forwardly facing housing passage shoulder, and a front portion forming a largely rearwardly-facing retainer-abutting shoulder;

an optical fiber terminus lying in said housing passage, said terminus including a body with front and rear ends and a ferrule extending forwardly from said body, said body and ferrule having aligned passage portions;

an optical fiber member lying in said aligned passage portions;

said body has a largely rearwardly-facing body shoulder;

a coil spring that has a rear end that lies against said housing passage shoulder, said coil spring having a spring front end;

a releaseable retainer with a rear portion that is biased forwardly by said spring front end, said retainer having a portion forming a plurality of tines that engage said body shoulder and that can be disengaged from said body shoulder, to enable removal of the terminus;

said retainer having a front end that abuts said retainer-abutting shoulder when said terminus is not present;

said retainer includes a clip that forms said tines, said clip having a clip rear end and said tines being resiliently deflectable, said retainer including a sleeve member which lies within said housing passage and that has a rear end that abuts said spring front end and that has a largely forwardly-facing shoulder that abuts said clip rear end.

7. In an optical fiber connector that includes a housing with a housing passage that has an axis, a terminus with a terminus passage and an optical fiber member extending through said terminus passage, said terminus lying in said housing, and said connector including a spring for urging said terminus forwardly, the improvement comprising:

said terminus forms a largely rearwardly-facing shoulder; and including a clip that is slideable in forward and rearward directions in said housing, said clip having a rear end that is biased forwardly by said spring and said clip having a front end that forms tines that extend at forward and radially-inwardly inclines and that have tine front ends that abut said terminus shoulder;

a sleeve member that lies in said housing passage and that is slideable in forward and rearward directions therein, said sleeve member having a rear end that engages a front end of said spring, and said sleeve member having an internal largely forwardly-facing shoulder that engages said clip rear end.

8. An optical fiber connector that includes a connector with a terminus having a front portion forming a ferrule and a rear portion forming a body, the terminus forming a fiber-holding terminus passage for holding an optical fiber, and the connector having a housing that has a terminus-holding housing passage with an axis and with a passage rear part forming a largely forwardly-facing housing passage shoulder, including a releaseable retainer lying in said housing passage around said terminus, said retainer having a rear portion forming a largely rearwardly-facing retainer spring-engaging shoulder, said terminus having a largely rearwardly-facing terminus shoulder;

said retainer forming at least one tine that extends at a radially inward incline toward said axis and that has a tip that abuts said rearwardly-facing terminus shoulder, said tine being radially outwardly deflectable to release said terminus;

said retainer is slideable along said housing passage in normal use; and including a coil spring extending between said housing passage shoulder and said retainer spring-engaging shoulder, and biasing said retainer forwardly, whereby said at least one tine can be deflected to remove said terminus rearwardly from said housing passage while said coil spring remains in said passage.

* * * * *